(12) United States Patent
Wang et al.

(10) Patent No.: US 11,420,708 B2
(45) Date of Patent: Aug. 23, 2022

(54) FIXED STABLE BRAKE HANDLE FOR PREVENTING HANDS FROM BEING PINCHED

(71) Applicant: LANXI JIEKE SPORTS APPARATUS MANUFACTURING CO., LTD., Zhejiang (CN)

(72) Inventors: Yihuai Wang, Zhejiang (CN); Yao Chen, Zhejiang (CN)

(*) Notice: Subject to any disclaimer, the term of this patent is extended or adjusted under 35 U.S.C. 154(b) by 0 days.

(21) Appl. No.: 17/427,150

(22) PCT Filed: Jan. 20, 2020

(86) PCT No.: PCT/CN2020/073133
§ 371 (c)(1),
(2) Date: Jul. 30, 2021

(87) PCT Pub. No.: WO2020/156304
PCT Pub. Date: Aug. 6, 2020

(65) Prior Publication Data
US 2022/0089248 A1  Mar. 24, 2022

(30) Foreign Application Priority Data

Jan. 31, 2019 (CN) .......................... 201920171773.4

(51) Int. Cl.
*B62L 3/02* (2006.01)
*G05G 1/04* (2006.01)
(52) U.S. Cl.
CPC . *B62L 3/02* (2013.01); *G05G 1/04* (2013.01)

(58) Field of Classification Search
None
See application file for complete search history.

(56) References Cited

U.S. PATENT DOCUMENTS

| | | | | |
|---|---|---|---|---|
| 5,669,268 A * | 9/1997 | Tsai | ................ | B62K 23/06 |
| | | | | 74/489 |
| 5,778,729 A * | 7/1998 | Tsai | ................ | B62K 23/06 |
| | | | | 74/489 |
| 5,910,193 A * | 6/1999 | Chen | ................ | G05G 1/04 |
| | | | | 74/489 |
| 5,941,127 A * | 8/1999 | Hayd | ................ | G05G 1/04 |
| | | | | 74/489 |
| 6,324,937 B1 * | 12/2001 | Chen | ................ | B62L 3/00 |
| | | | | 74/501.6 |

* cited by examiner

*Primary Examiner* — Vicky A Johnson
(74) *Attorney, Agent, or Firm* — Prakash Nama; Global IP Services, PLLC

(57) ABSTRACT

A fixed and stable anti-pinch brake handlebar includes a handle piece, a fixing screw, a fixing block, a return spring, a brake cable housing fixing block, a brake cable housing fixing slot, an adjusting nut, a brake cable fixing slot, screw-threaded fixing holes and a semi-circular block. The handle piece is movably connected to the fixing block via the fixing screw. The return spring is provided on the fixing screw. The brake cable housing fixing block is provided at an end of the handle piece. The brake cable housing fixing slot is provided on the brake cable housing fixing block. The adjusting nut is provided on the brake cable housing fixing slot. The brake cable fixing slot is provided on the fixing block. Both sides of the fixing block are provided with the screw-threaded fixing holes. The fixing block is connected to the semi-circular block via the screw-threaded fixing holes.

4 Claims, 3 Drawing Sheets

FIXED STABLE BRAKE HANDLE FOR PREVENTING HANDS FROM BEING PINCHED

BACKGROUND OF THE INVENTION

The invention relates to the technical field of brake devices, and more specifically relates to a fixed and stable anti-pinch brake handlebar.

A handlebar is an important component for reducing the speed of a bicycle in order to cope with changes in road conditions or the distance from the car ahead when riding a bicycle. It mainly utilizes the principle of friction to achieve deceleration effect. When the rider presses the brake lever, the brake cable is triggered to activate the brake clamp, so that the brake pads of the brake clamp rub against the wheel rim to reduce the speed. However, the problem is that the brake lever in the prior art is easy to pinch the hand or other objects, especially when used by children, and the fixing block is not fixed firmly.

BRIEF SUMMARY OF THE INVENTION

In view of the disadvantages of the prior art described above, the present invention provides a fixed and stable anti-pinch brake handlebar.

To achieve the above objects of the present invention, the present invention has the following technical solutions: A fixed and stable anti-pinch brake handlebar comprising a handle piece, a fixing screw, a fixing block, a return spring, a brake cable housing fixing block, a brake cable housing fixing slot, an adjusting nut, a brake cable fixing slot, screw-threaded fixing holes and a semi-circular block; the handle piece is movably connected to the fixing block via the fixing screw; the return spring is provided on the fixing screw; the brake cable housing fixing block is provided at an end of the handle piece; the brake cable housing fixing slot is provided on the brake cable housing fixing block; the adjusting nut is fixedly provided on the brake cable housing fixing slot; the brake cable fixing slot is provided on the fixing block; both sides of the fixing block are symmetrically provided with screw-threaded fixing holes; the fixing block is fixedly connected to the semi-circular block via the screw-threaded fixing holes.

Preferably, one end of the handle piece is provided with an arc segment.

Preferably, a fixing bolt is provided in each of the screw-threaded fixing holes.

Preferably, the handle piece and the fixing block are connected by having both the handle piece and the fixing block to serve as two lever arms and the fixing screw to serve as fulcrum so that the two lever arms are respectively located at two sides of the fulcrum.

The beneficial effects of the present invention are as follows:

The present invention adopts the above technical solutions to provide a fixed and stable anti-pinch brake handlebar which is anti-pinch, fixed and stable, and convenient to use; it could achieve a large lever ratio in a relatively small overall size and a longer handlebar, with a wider gripping surface to improve comfort.

DETAILED DESCRIPTION OF THE INVENTION

Figure 1:
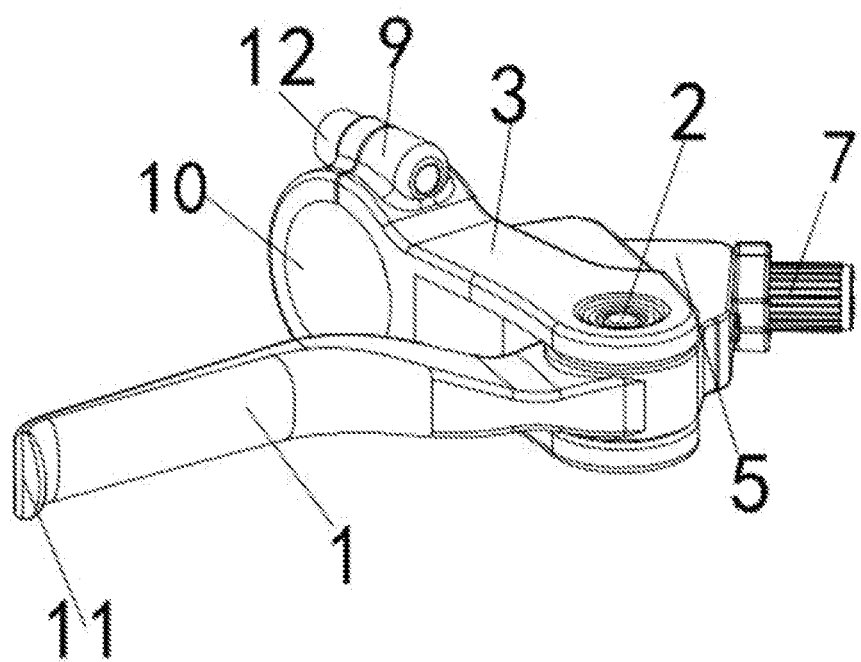
FIG. 1 is a three-dimensional schematic diagram of the present invention.
Figure 2:
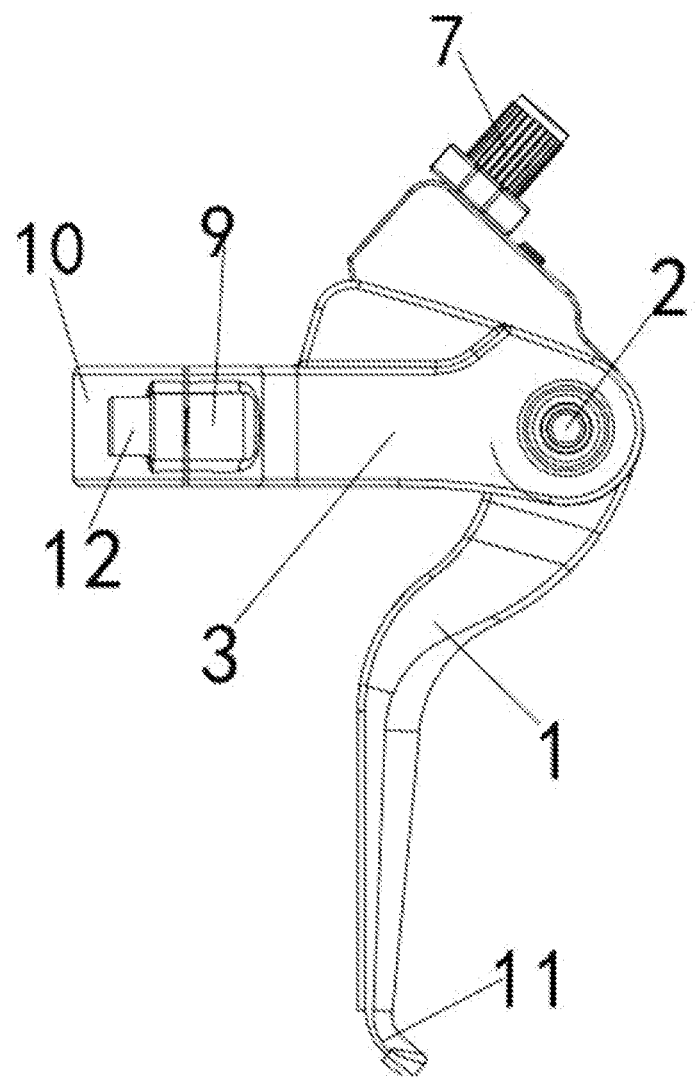
FIG. 2 is a side schematic diagram of the present invention.
Figure 3:
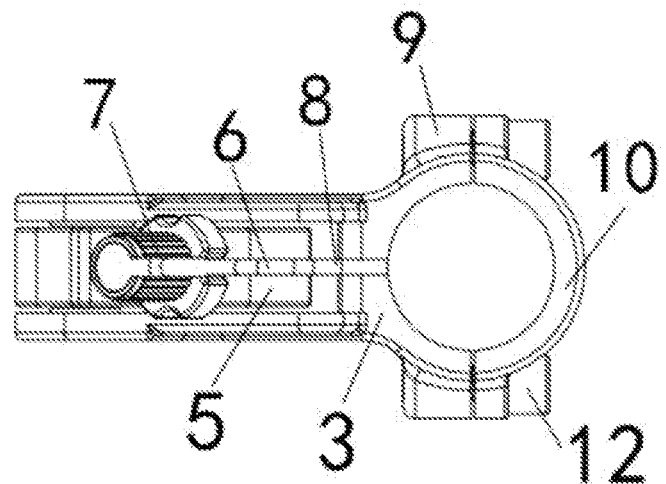
FIG. 3 is a bottom schematic diagram of the present invention.
Figure 4:
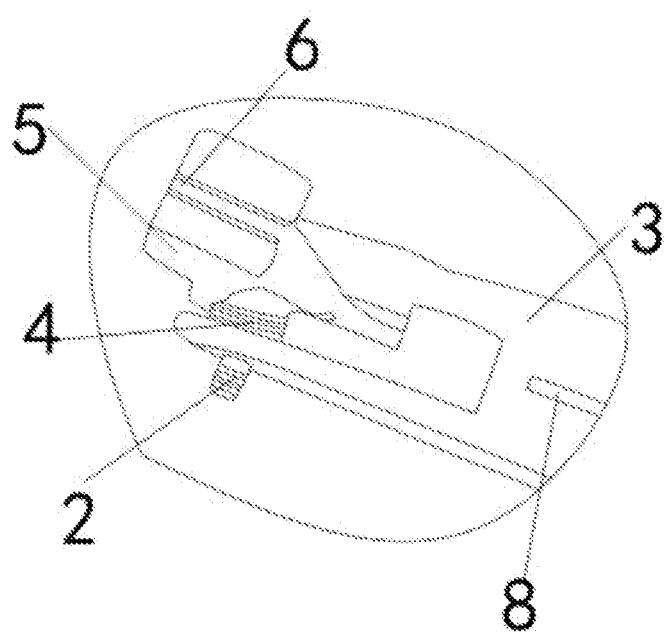
FIG. 4 is a partial schematic diagram of the present invention.

As shown in FIGS. 1, 2, 3 and 4, a fixed and stable anti-pinch brake handlebar comprises a handle piece 1, a fixing screw 2, a fixing block 3, a return spring 4, a brake cable housing fixing block 5, a brake cable housing fixing slot 6, an adjusting nut 7, a brake cable fixing slot 8, screw-threaded fixing holes 9 and a semi-circular block 10. The handle piece 1 is movably connected to the fixing block 3 via the fixing screw 2. The return spring 4 is provided on the fixing screw 2. The brake cable housing fixing block 5 is provided at an end of the handle piece 1. The brake cable housing fixing slot 6 is provided on the brake cable housing fixing block 5. The adjusting nut 7 is fixedly provided on the brake cable housing fixing slot 6. The brake cable fixing slot 8 is provided on the fixing block 3. Both sides of the fixing block 3 are symmetrically provided with screw-threaded fixing holes 9. The fixing block 3 is fixedly connected to the semi-circular block 10 via the screw-threaded fixing holes 9. One end of the handle piece 1 is provided with an arc segment 11. A fixing bolt 12 is provided in each of the screw-threaded fixing holes 9. The handle piece 1 and the fixing block 3 are connected by having both the handle piece 1 and the fixing block 3 to serve as two lever arms and the fixing screw 2 to serve as fulcrum so that the two lever arms are respectively located at two sides of the fulcrum.

When in use, first mount the fixing block 3 on the handlebar of the bicycle. During mounting, the fixing bolts 12 used to connect the fixing block 3 and the semi-circular block 10 is loosened to disengage the fixing block 3 from the semi-circular block 10, so that the fixing block 3 can be easily mounted on the bicycle handlebar. For fixing, it is only need to tighten the fixing bolts 12 to firmly fix the fixing block 3 to the bicycle handlebar. Existing bicycles are equipped with a cylindrical fixing block at the end of the brake cable for fixing it to the brake lever of the bicycle. The cylindrical fixing block at the end of the bicycle brake cable is then inserted into the brake cable fixing slot 8 of the fixing block 3, and the brake cable then passes through the brake cable fixing slot 8. Thereafter, the brake cable housing fixing block 5 which is provided with the brake cable fixing slot 6 thereon is fixed to the adjusting nut 7, and the handle piece 1 is movably connected to the fixing block 3 via the fixing screw 2, with both the handle piece 1 and the fixing block 3 serving as two lever arms and the fixing screw 2 serving as fulcrum so that the two lever arms are respectively located at two sides of the fulcrum. As a result, it is possible to achieve a large lever ratio in a relatively small overall size and a longer handlebar, with a wider gripping surface to improve comfort. The handle piece 1 can be rotated around the fixing screw 2 in relation to the fixing block 3. The return spring 4 on the fixing screw 2 facilitates the reset of the handle piece 1 after rotation. When gripping the handle piece 1, the handle piece 1 exerts a thrust on the brake cable housing, and the brake cable is fixed on the fixing block 3 and cannot move, thereby activating the braking device by the braking cable. The reset position of the right handle piece 1 is on the left side of the handle piece 1; similarly, the reset position of the left handle piece 1 is on the right side of the handle piece 1; therefore, the hands would not be pinched, and the arc segment 11 of one end of the handle piece 1 can prevent the rider's hands from sliding away from the handle piece 1.

A person skilled in this field of art may make various changes, modifications or replacements to the embodiment as disclosed without deviating from the spirits of the present invention or exceeding the scope as defined in the appended claims of the present invention.

What is claimed is:

1. A fixed and stable anti-pinch brake lever, comprising a handle piece, a fixing screw, a fixing block, a return spring, a brake cable housing fixing block, a brake cable housing fixing slot, an adjusting nut, a brake cable fixing slot, screw-threaded fixing holes and a semi-circular block, characterized in that the handle piece is movably connected to the fixing block via the fixing screw; the return spring is provided on the fixing screw; the brake cable housing fixing block is provided at an end of the handle piece; the brake cable housing fixing slot is provided on the brake cable housing fixing block; the adjusting nut is fixedly provided on the brake cable housing fixing slot; the brake cable fixing slot is provided on the fixing block; both sides of the fixing block are symmetrically provided with screw-threaded fixing holes; the fixing block is fixedly connected to the semi-circular block via the screw-threaded fixing holes; the fixing screw is positioned corresponding to an end of the fixing block opposite to an end of the fixing block fixedly connected to the semi-circular block;

the brake cable fixing slot opens at the end of the fixing block fixedly connected to the semi-circular block such that the brake cable fixing slot is adapted to receive a brake cable of a bicycle.

2. The fixed and stable anti-pinch brake as in claim 1, characterized in that one end of the handle piece is provided with an arc segment.

3. The fixed and stable anti-pinch brake lever as in claim 1, characterized in that a fixing bolt is provided in each of the screw-threaded fixing holes.

4. The fixed and stable anti-pinch brake lever as in claim 1, characterized in that the handle piece and the fixing block are connected by having both the handle piece and the fixing block to serve as two lever arms and the fixing screw to serve as fulcrum so that the two lever arms are respectively located at two sides of the fulcrum.

\* \* \* \* \*